US006222343B1

(12) United States Patent
Crisp et al.

(10) Patent No.: US 6,222,343 B1
(45) Date of Patent: Apr. 24, 2001

(54) BATTERY CHARGER, A METHOD FOR CHARGING A BATTERY, AND A SOFTWARE PROGRAM FOR OPERATING THE BATTERY CHARGER

(75) Inventors: Robert Crisp, Mukwonago; Kevin Glasgow, Campbellsport; Joseph Willhide, Brookfield, all of WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 09/374,558

(22) Filed: Aug. 13, 1999

Related U.S. Application Data

(60) Provisional application No. 60/096,524, filed on Aug. 14, 1998.

(51) Int. Cl.[7] .......................... H01M 10/44; H01M 10/46
(52) U.S. Cl. ............................................. 320/110; 320/150
(58) Field of Search .................................. 320/106, 110, 320/134, 136, 128, 150

(56) References Cited

U.S. PATENT DOCUMENTS

| | | | |
|---|---|---|---|
| 3,105,183 | 9/1963 | Hysler et al. | 320/39 |
| 3,113,255 | 12/1963 | Eberts | 320/36 |
| 3,735,232 | 5/1973 | Fister | 320/2 |
| 3,943,423 | 3/1976 | Hoffman | 320/22 |
| 4,041,369 | 8/1977 | King et al. | 322/99 |
| 4,665,354 | 5/1987 | Sada et al. | 320/64 |
| 4,962,462 | 10/1990 | Fekete | 364/492 |
| 5,049,804 | 9/1991 | Hutchings | 320/20 |
| 5,113,127 | 5/1992 | Hoffman et al. | 320/21 |
| 5,187,422 | 2/1993 | Izenbaard et al. | 320/2 |
| 5,200,690 | 4/1993 | Uchida | 320/20 |
| 5,420,494 | 5/1995 | Lu | 320/21 |
| 5,489,836 | 2/1996 | Yuen | 320/32 |
| 5,519,302 | 5/1996 | Mino et al. | 320/21 |
| 5,523,668 | 6/1996 | Feldstein | 320/6 |
| 5,543,702 | 8/1996 | Pfeiffer | 320/15 |
| 5,612,607 | 3/1997 | Nicolai | 320/20 |
| 5,633,574 | 5/1997 | Sage | 320/21 |
| 5,644,211 | 7/1997 | Tokuyama | 320/29 |
| 5,686,808 | 11/1997 | Lutz | 320/2 |
| 5,691,622 | 11/1997 | Mack et al. | 320/29 |
| 5,694,023 | 12/1997 | Podrazhansky et al. | 320/21 |

*Primary Examiner*—Edward H. Tso
(74) *Attorney, Agent, or Firm*—Michael Best & Friedrich LLP

(57) ABSTRACT

A battery charger, a method for charging a battery, and a software program for operating the battery charger. The battery charger is capable of charging different types of batteries and capable of operating on alternate sources of AC power. Also, the battery charging circuit will not operate if one of the power source, the battery, the power switch means and the control means (including the Microcontroller) malfunctions. In addition, in the battery charging circuit, the battery under charge supplies power to operate the circuit and the Microcontroller.

24 Claims, 5 Drawing Sheets

BATTERY CHARGER, A METHOD FOR CHARGING A BATTERY, AND A SOFTWARE PROGRAM FOR OPERATING THE BATTERY CHARGER

This application claims the benefit of prior filed co-pending provisional patent application, Ser. No. 60/096,524, filed on Aug. 14, 1998.

BACKGROUND OF THE INVENTION

The present invention relates to battery chargers and, more particularly, to an improved battery charger and battery charging circuit.

A typical battery charger includes a battery charging circuit which is connectable to a power source and to a rechargeable battery and which is operable to charge the battery.

SUMMARY OF THE INVENTION

One of the problems with some existing battery chargers is that the battery charging circuit does not operate continuously on different sources of AC power.

Another problem with some existing battery chargers is that the battery charging circuit does not provide charge current to the batteries as efficiently as possible.

A further problem with some existing battery chargers is that some battery chargers are not able to charge both Nickel-cadmium (NiCd) and Nickel-Metal Hydride (NiMH) batteries.

Yet another problem with some existing battery chargers is that, in order to charge both types of Nickel battery chemistries, these battery chargers require special identification components.

Another problem with existing battery chargers is that the battery charging circuit does not shut down if one of the components of the battery charging circuit fails or malfunctions. Specifically, some other existing battery chargers utilize topologies in which charge and control components are separate. In such existing chargers, a single failure on the printed circuit board or battery could result in uncontrolled charge and, thus, overcharging.

A further problem with existing battery chargers is that a separate low voltage supply is required to control the battery charging circuit.

Yet another problem with some existing battery chargers is that several separate components and circuits are necessary to perform the required functions of the battery charger, increasing the cost and complexity of the battery charger.

The present invention provides a battery charger that alleviates the problems with existing battery chargers. The invention provides a battery charger for charging different types of batteries and capable of operating on alternate sources of AC power. Also, the invention provides a battery charging circuit which will not operate if one of the power source, the battery, the power switch means and the control means (including the Microcontroller) malfunctions. In addition, the invention provides a battery charging circuit in which the battery under charge supplies power to operate the circuit and the Microcontroller.

In one aspect, the invention provides a battery charger comprising a battery charging circuit electrically connectable to a power source and to a battery and operable to charge the battery, the circuit including power switch means operable to provide power from the power source to charge the battery, and control means for operating the circuit, the control means being electrically connected to the circuit and providing a control signal to the power switch means to control the power switch means, the power source, the battery, the power switch means and the control means being electrically connectable by the circuit so that, when one of the power source, the battery, the power switch means and the control means malfunctions, the circuit does not operate to charge the battery. Preferably, the circuit electrically connects the power source, the battery, the power switch means and the control means in series.

In another aspect, the invention provides a method of charging a battery, the method comprising the acts of providing the battery charger, connecting the battery charger to the power source, connecting the battery to the battery charger, electrically connecting the power source, the battery, the power switch means and the Microcontroller so that, when the battery is connected to the circuit, if one of the power source, the battery, the power switch means and the Microcontroller malfunctions, the circuit will not operate to charge the battery, charging the battery, monitoring the circuit to determine when one of the power source, the battery, the power switch means and the Microcontroller malfunctions, and, if one of the power source, the battery, the power switch means and the Microcontroller malfunctions, preventing the circuit from charging the battery. Preferably, the act of electrically connecting the power source, the battery, the power switch means and the Microcontroller includes electrically connecting the power source, the battery, the power switch means and the control means in series.

In a further aspect, the invention provides a battery charger comprising a battery charging circuit connectable to a power source and to a battery and operable to charge the battery, and a Microcontroller electrically connected to and for operating the circuit, the battery, when connected to the circuit, supplying power to operate the Microcontroller.

In yet another aspect, the invention provides a method for operating the battery charger, the method comprising the acts of providing a battery, connecting the battery to the battery charging circuit, and supplying power from the battery to the Microcontroller to operate the Microcontroller.

In another aspect, the invention provides a software program for operating the battery charger.

One advantage of the present invention is that the battery charger will operate continuously on alternate sources of AC power, such as alternators, generators, inverters and welders.

Another advantage of the present invention is that the battery charging circuit provides charge current to the batteries as efficiently as possible.

A further advantage of the present invention is that the battery charger is able to charge both types of Nickel battery chemistries in the same charger.

Yet another advantage of the present invention is that the battery charger is able to charge both types of Nickel battery chemistries without any special identification schemes and/or electronic components.

Another advantage of the present invention is that the power supply, power switch means, battery and Microcontroller are connected in a circuit such that, if any one of these components fails, the battery charging circuit will shut down.

A further advantage of the present invention is that the battery being charged provides power to the low voltage supply which, in turn, steps down and regulates a low voltage supply to the Microcontroller.

Yet another advantage of the present invention is that the Microcontroller includes integrated components which perform many of the required functions of the battery charger, reducing the cost and complexity of the battery charger.

Other features and advantages of the invention will become apparent to those skilled in the art upon review of the following detailed description, claims and drawings.

DETAILED DESCRIPTION OF THE PREFERRED EMBODIMENT

Figure 1:
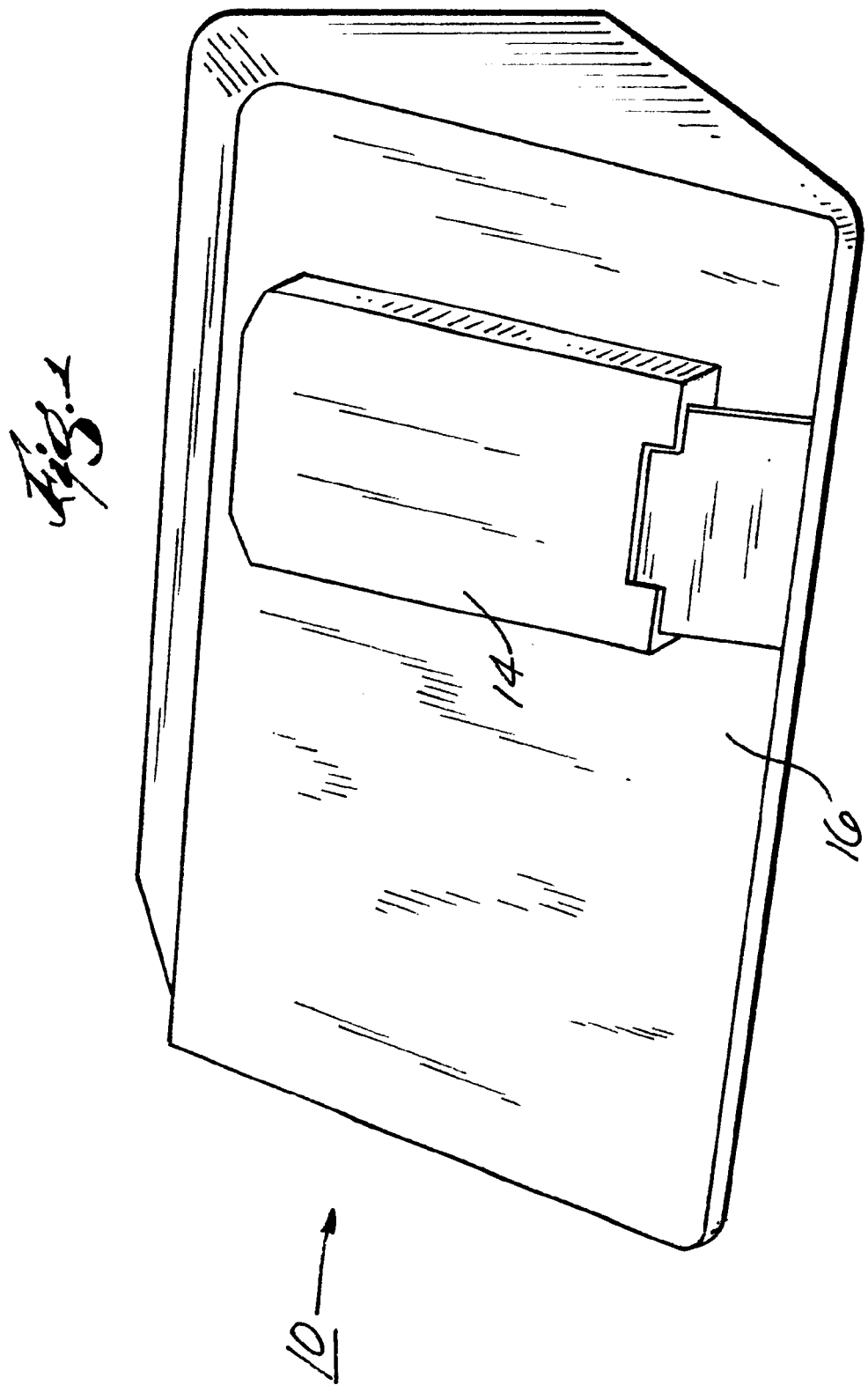
FIG. 1 is a perspective view of a battery charger embodying the present invention.
Figure 2:
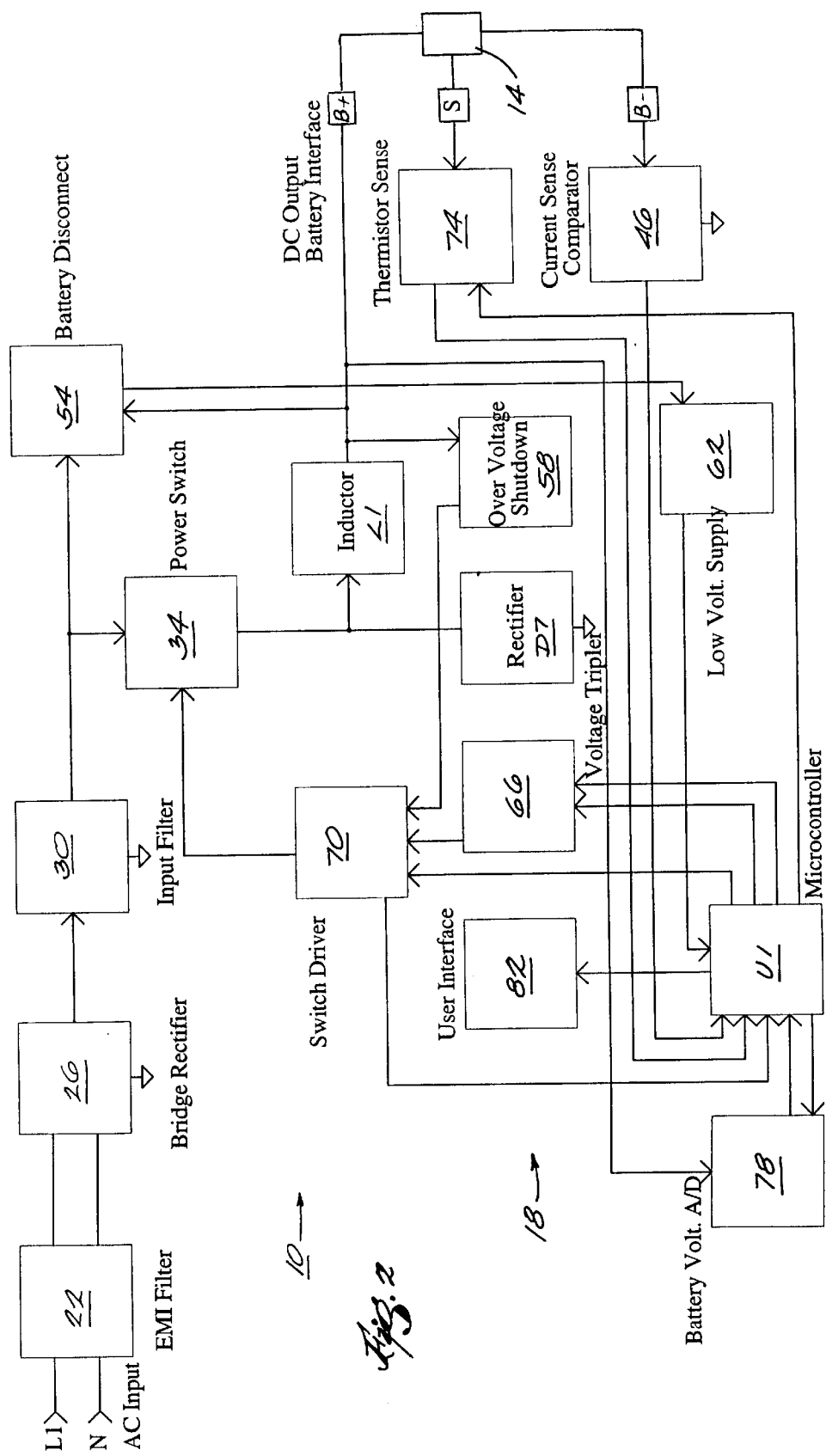
FIG. 2 is a block diagram of the battery charger and of a battery charging circuit.
Figure 3:
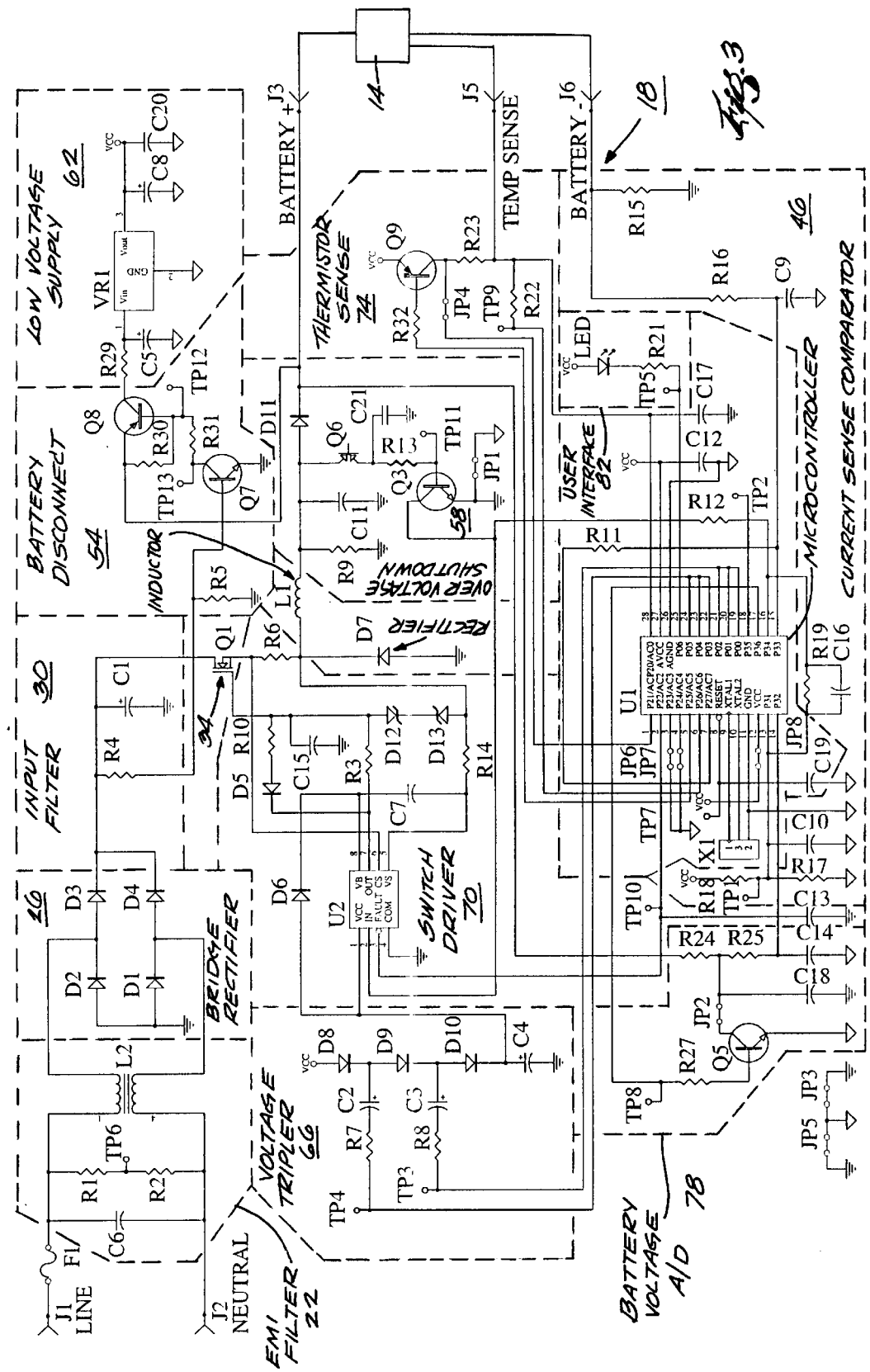
FIG. 3 is a schematic diagram of the portions of the battery charging circuit illustrated in FIG. 2.

A battery charger 10 embodying the invention is illustrated in FIG. 1, in a block diagram in FIG. 2 and schematically in FIG. 3. The battery charger 10 is connectable to any type of AC power source (not shown), such as an alternator, a generator, an inverter or a welder, to charge a battery 14. The battery 14 may be any voltage from 9.6 V to 18 V and may be any type of battery. In the illustrated construction the battery 14 is a Nickel-cadmium (NiCd) or a Nickel-Metal Hydride (NiMH) battery. The battery charger 10 includes a housing 16 supporting the battery 14 and a battery charging circuit 18 which is connectable to the power source and to the battery 14 and which is operable to charge the battery 14.

The battery charging circuit 18 includes an EMI filter circuit 22 (capacitor C6, inductor L2) which filters out electrical noise of the input power source during operation of the battery charger 10. The battery charging circuit 18 further includes a bridge rectifier 26 (diodes D1–D4) which rectifies or converts the alternating current (AC) and the voltage passing through the EMI filter circuit 22 into direct current (DC) and the voltage required for the creation of the charging current for the battery 14. An input filter 30 (capacitor C1) filters or smoothens out the DC voltage (ripple) created by the AC to DC rectification function of the bridge rectifier 26.

The battery charging circuit 18 also includes a "buck regulator". The buck regulator includes power switch means 34 (i.e., a MOSFET transistor Q1), a rectifier (diode D7), an inductor (L1), and the battery 14 under charge. In general, the power switch means 34 are electrically connected to the input filter 30 and functions like a mechanical on/off switch, except under electronic control. It should be understood that, in other constructions (not shown), another electronic switching component, such as, for example, a relay or a SCR switch, or a mechanical switch could be included in the power switch means 34.

The rectifier (D7) "free wheels" or conducts completing the circuit when the power switch means 34 turns off. The power switch means 34 apply or turn off current and voltage to the inductor (L1). The inductor (L1) has magnetic properties that work together with the capacitive properties of the battery 14 to store energy during the time the power switch means 34 is off.

The battery charging circuit 18 also includes a current sense comparator circuit 46 (resistors R18, R17, capacitor C10, resistor R19, capacitors C16, C9, resistors R16, R15) to measure the battery charge current and provide information to a Microcontroller (U1). The Microcontroller (U1) is a programmable, integrated component which consolidates and controls many of the functions of the battery charger 10. The Microcontroller (U1) monitors the status of the battery 14 before, during and after charging and monitors and controls the operation of the battery charging circuit 18 by outputting a control signal to the buck regulator before, during and after charging.

The battery charging circuit 18 also includes a battery disconnect circuit 54 (resistors R4, R5, transistor Q7, resistors R30, R31, transistor Q8) which disengages the battery charger control circuit if the battery charger 10 is unplugged or if the line voltage is too low. An over voltage shutdown circuit 58 (transistor Q6, resistor R13, transistor Q3, capacitor C21) turns off the power switch means 34 when an over voltage condition exists on the output of the inductor (L1).

The power source, the battery 14, the power switch means 34 and the Microcontroller (U1) are electrically connected by the battery charging circuit 18 so that, when the battery 14 is connected to the battery charging circuit 18, if any one of the power source, the battery 14, the power switch means 34 and the Microcontroller (U1) malfunction, the battery charging circuit 18 will not operate to charge the battery 14.

The battery charging circuit 18 also includes a low voltage supply circuit 62 (resistor R29, capacitor C5, voltage regulator VR1, capacitors C8, C12) which steps down, regulates and provides a low voltage supply to power the control circuits and, specifically, the Microcontroller (U1). A voltage tripler circuit 66 (resistors R7, R8, capacitors C2, C3, C4, diodes D8, D9, D10) creates a low voltage power supply which is dependent on the Microcontroller (U1). The voltage tripler circuit 66 supplies power to a switch driver circuit 70 (MOSFET driver U2, diode D6, capacitor C7, diode D5, resistor R3, diodes D12, D13, resistor R6). The switch driver circuit 70 outputs a drive signal to turn the power switch means 34 on or off on reception of a control signal from the Microcontroller (U1). The switch driver circuit 70 also transforms and conditions the control signal from the Microcontroller (U1) to the required state and level for the power switch means 34.

A thermistor sense circuit 74 (resistors R22, R23, R32, transistor Q9) provides a means for identifying the type of battery 14 (i.e., NiCd or NiMH) connected to the battery charging circuit 18. The thermistor sense circuit 74 senses and conditions the thermistor signal from a NiCd battery or a NiMH battery for application (as the identification signal) to the Microcontroller (U1). A battery voltage A/D circuit 78 (resistor R27, transistor Q5, resistors R24, R25, capacitor C14, resistor R11) works together with the Microcontroller (U1) to form a voltage conversion function. This conversion process is required to precisely measure the voltage of the battery 14 before and during the charging cycle. The battery voltage A/D circuit 78 is electrically connected to the battery 14. A user interface circuit 82 (light emitting diode LED, resistor R1) provides feedback to the user on the status of the battery charger 10 and the battery charging process.

The following sections describe the functions of the individual circuit blocks. Each block represents a circuit function. Refer to the Block Diagram (FIG. 2) and to the Schematic Diagram (FIG. 3) for information on the block locations and inter-connectivity.

EMI Filter, Bridge Rectifier, Input Filter Circuits

The EMI filter 22 (capacitor C6, inductor L2), bridge rectifier 26 (diodes D1–D4) and input filter 30 (capacitor C1), provide a standard way of converting AC line power to a "DC Bus" voltage used as an input to the buck regulator (the power switch means 34, the rectifier (diode D7), the inductor (L1) and the battery 14).

Power Switch, Rectifier, Inductor, Current Sense Comparator Circuits

When the power switch means 34 (i.e., MOSFET transistor Q1) turn on, current is supplied from the "DC Bus" to the battery 14 through the inductor (L1). The inductor (L1) establishes a rise time and, at a pre-determined peak level, the power switch means 34 are shut off. At the moment the power switch means 34 turn off, the rectifier (diode D7) conducts, or "free wheels" providing the closed loop consisting of the rectifier (diode D7), the inductor (L1), and the battery 14. This allows inductor (L1) to discharge its stored energy into the battery 14. The current decays down to a pre-determined minimum level at which point the power switch means 34 is turned back on, and the charging cycle is repeated.

The on/off levels of current are determined by hysteretic control of the current sense comparator circuit 46 (resistors R18, R17, capacitor C10, resistor R19, capacitors C16, C9, resistors R16, R15). The Microcontroller (U1) contains an integrated comparator which is used to perform this function along with the other circuit components. The output of the comparator is "gated" within the Microcontroller (U1) to allow for control and monitoring of the power circuit (EMI Filter 22, bridge rectifier 26, input filter 30, power switch means 34, inductor (L1), rectifier (diode D7)). The Microcontroller (U1) controls the power circuit to implement a circuit turn on delay, a circuit turn off for battery voltage and temperature measurement, and charge termination. Power circuit monitoring is also performed by the Microcontroller (U1) to check for correct on time and frequency of the power switch means 34. The gated signal of the comparator is in the form of a constantly varying pulse train which serves to regulate the on-time of power switch means 34 which, in turn, regulates charge current.

Voltage Tripler Circuit

The components of the circuit 66 (resistors R7, R8, capacitors C2, C3, C4, diodes D8, D9, D10) function as a voltage tripler. This is accomplished by receiving two separate complementary outputs from the Microcontroller (U1) operating at a fixed 50% duty cycle and frequency. The voltage tripler circuit 66 creates a low voltage power supply of sufficient level that is dependent on the Microcontroller (U1). This power supply is used to energize the high side MOSFET driver circuit (switch driver circuit 70). The complementary 5 V DC square wave signals from the Microcontroller (U1) are capacitively coupled as a result of this tripler circuit providing a 13 V DC level (15 V DC minus three diode drops D8–D10).

This method provides a robust way of fault protection. The software controls the fixed frequency square wave outputs. If for any reason the Microcontroller (U1) malfunctions, glitches or latches up, and causes the software program to stop running or to run erratically, the square waves would stop or vary (not 50% duty cycle) and the tripler output voltage (seen at capacitor C4) would decay and fall below a voltage threshold determined by the MOSFET driver (U2), thus turning off the power switch means 34 and the charge current. This voltage tripler method relies only on a 50% duty cycle running square wave and is also frequency dependent. If the Microcontroller (U1) ran at a faster clock rate, the voltage tripler circuit 66 would also droop and cause a shutdown. Additionally, the voltage tripler circuit 66 can only supply a certain amount of power. If the MOSFET switch driver (U2) operates at too high of a frequency or for too long of an on-time, the tripler level (seen at capacitor C4) would be depleted and again the power switch means 34 would be turned off and the charge current would be terminated.

Switch Driver Circuit

The voltage tripler circuit 66 supplies power to the switch driver circuit 70 or high side MOSFET driver circuit 70 (MOSFET driver U2, diode D6, capacitor C7, diode D5, resistors R3, R10, R14, diodes D12, D13, resistor R6). The high side switch driver circuit 70 supplies the needed gate voltage for the power switch means 34. This voltage needs to be higher than the "DC Bus" voltage seen at the inductor (L1) by approximately 10 V DC. So, in effect, the power switch means 34 gate voltage is stacked on top of the DC voltage at the inductor (L1) by 10 V. This allows the power switch means 34 to become fully enhanced or turned on.

The MOSFET driver (U2) has its own charge pump function to accomplish the task of taking the voltage tripler voltage and stacking it on the "DC Bus" voltage (diode D6, capacitor C7). The MOSFET driver (U2) also has under voltage and over current protection and a fault output signal which is fed back to the Microcontroller (U1). Resistors (R3, R10) set the rise and fall time of the power switch means 34 to help control switching losses. Resistor (R6) is a current sensing resistor to provide additional MOSFET protection (i.e., poor power quality, surges, etc.).

Low Voltage Supply Circuit

The low voltage supply circuit 62 (resistor R29, capacitor C5, voltage regulator VR1, capacitors C8, C20) provides regulated 5 V DC power to the Microcontroller (U1) and external control circuitry (the current sense comparator circuit 46, the battery disconnect circuit 54, the low voltage supply circuit 62, the voltage tripler circuit 66, the switch driver circuit 70, the thermistor sense circuit 74, the battery voltage A/D circuit 78 and the user interface 82). The power supplied to the input of the low voltage supply circuit 62 is provided by the battery 14 being charged.

Battery Disconnect Circuit

The battery disconnect circuit 54 (resistors R4, R5, transistor Q7, resistors R30, R31, transistor Q8) disengages the battery charger control circuit (the Micrcontroller (U1) and the external control circuitry) if the battery charger 10 is unplugged or if the line voltage is too low. This prevents the battery 14 from discharging if it is left in the battery charger 10 and the AC line voltage goes to zero or if the battery charger 10 is unplugged. Additionally, the battery charger 10 draws only mWatts of power from the AC input when no battery is connected to the battery charger 10.

Over Voltage Shutdown Circuit

The over voltage shutdown circuit 58 (transistor Q6, resistor R13, transistor Q3, capacitor C21) turns off the power switch means 34 when an over voltage condition exists on the output of the inductor (L1). The over voltage shut down circuit 58 is electrically connected to the switch driver circuit 70. An over voltage condition can occur when a battery 14 is removed from the battery charging circuit 18 during charging and/or under a fault condition. The over voltage shut down circuit 58 turns the power switch means 34 off via the switch driver circuit 70 by "clamping" the control signal from the Microcontroller (U1) off.

Microcontroller

The function of Microcontroller (U1) is to reside as the "heart" of the battery charger 10. The Microcontroller (U1)

is programmable and operates to provide five main functions: identify the battery 14 prior to charge; monitor and control the power circuit and the charge current applied to the battery 14; determine the voltage of the battery 14 while charging; determine the temperature of the battery 14 before, during, and after charge; and signal to the user the charging state of the battery charger 10.

It should be understood that, in other constructions (not shown), the functions performed by the Microcontroller (U1) can be performed by separate electronic components and circuits.

Battery Voltage A/D Circuit

The battery voltage A/D circuit 78 (resistor R27, transistor Q5, resistors R24, R25, capacitor C14, Microcontroller U1, resistor R11) converts the analog battery voltage into a digital representation to be processed by the Microcontroller (U1). It is based on a dual slope analog to digital converter technique, whereby a capacitor (C14) is charged for a fixed period of time from a known voltage reference (integration) and then discharged to the same known voltage reference (de-integration). The time for the capacitor (C14) to discharge to the reference is measured by the Microcontroller (U1) and converted into a battery voltage.

Thermistor Sense Circuit

The thermistor sense circuit 74 (resistors R22, R23, R32, transistor Q9) conditions and provides the ability to apply and remove a voltage source needed to measure the NiCd and NiMH battery thermistor resistance. Due to the fact that the NiCd and NiMH batteries have different thermistor resistance values, the voltage drop created across the thermistor when the voltage source is applied to the battery 14 is different. The voltage drop is measured by the on board A/D converter in the Microcontroller (U1), and the result is compared against calculated values stored in the Microcontroller (U1). The result of the comparisons yield the ability to determine the battery chemistry (NiCd or NiMH), the temperature of the battery 14, and whether or not the thermistor is open or shorted.

User Interface

The user interface 82 (light emitting diode LED, resistor R1) signals to the user the charging state of the battery charger 10. The user interface 82 is in the form of a light emitting diode (LED) device. The states of the LED are "Off", "On", and "Flashing". The LED is "Off" when no battery is present, when the battery charger 10 is ready for charge, when charging is complete, or during maintenance charging. The LED is "On" during charging. The LED is "Flashing" when the battery 14 is too hot or too cold to charge.

Circuit Operation

When a battery 14 is inserted and the battery charger 10 is plugged in, operation is as follows:

The battery 14 is inserted into the battery charger 10. The voltage regulator (VR1) and associated circuitry turn on and provide regulated 5 V DC to the Microcontroller (U1). The Microcontroller (U1) initializes a start up sequence. After a delay, the voltage tripler circuit 66 pumps up to its steady state level of approximately 13 V DC causing the MOSFET driver (U2) to come out of undervoltage lock out. The Microcontroller (U1) gates the charge current comparator "on" and a 5 VD C signal (leading edge) is supplied to the MOSFET driver (U2) which in turn provides a 12 V signal from gate to source on the power switch means 34 (i.e., the MOSFET transistor Q1). The power switch means 34 turns on, starting current flow through inductor (L1) and into the battery 14.

During start up, the thermistor sense circuit 74 identifies the type of battery 14 (i.e., NiCd or NiMH) connected to the battery charging circuit 18, based on the thermistor value of the battery 14. The thermistor sense circuit 74 provides the battery type identification signal to the Microcontroller (U1) so that the Microcontroller (U1) can control the battery charging circuit 18 to charge the battery 14 in an appropriate manner for the given battery type.

The current sense comparator circuit 46 monitors the current levels and appropriately turns the power switch means 34 on and off, regulating the current. During the off times, the voltage tripler circuit 66 replenishes the charge on capacitor (C4) keeping the necessary voltage levels up. The Microcontroller (U1) monitors voltage and temperature of the battery 14 to terminate the charging process at the appropriate time (the termination point) for the type of battery 14 (i.e., NiCd or NiMH).

In the event that the battery 14 is removed from the battery charger 10, the over voltage shutdown circuit 58 will immediately turn the power switch means 34 off, preventing high voltage from appearing at the output. A resistor (R29) and capacitor (C5) on the input to the low voltage supply circuit 62 serve to protect the voltage regulator (VR1) of the low voltage supply circuit 62 during such a condition.

One feature of the battery charger 10 is that the control and sensing circuitry are in series with the battery charging circuit 18 via the Microcontroller (U1). As discussed above, some other existing battery chargers utilize topologies in which charge and control components are separate. In such existing chargers, a single failure on the printed circuit board or battery could result in uncontrolled charge and, thus, overcharging.

While not in use but "plugged in" (connected to the power source), the battery charger 10 is essentially off and not powered. There is no chance for the Microcontroller (U1) to become damaged or latched up (i.e., due to poor power quality (voltage spikes and/or surges)) while attached to AC power supply. This is because the control circuitry and Microcontroller (U1) receive power from the battery 14, and no battery is present. The control circuitry, including the Microcontroller (U1), is off and disconnected from any power supply.

When voltage is applied to the input power source, the battery charging circuit 18 will remain inactive and will draw only mWatts of power from the AC line input power source unless a battery 14 is connected to the battery charging circuit 18. When the battery 14 is attached to the DC output, the battery charging circuit 18 becomes operational. Because the battery charging circuit 18 remains inactive until the battery 14 is connected, the battery charging circuit 18 is very efficient, even if the battery charger 10 is left attached to the AC line but unattended and not being utilized to charge a battery 14.

The battery charging circuit 18 becomes active when the battery 14 is attached because the battery 14 is used as the source of power for the control circuit, including the Microcontroller (U1). The battery 14 powers the low voltage supply circuit 62 which, in turn, powers the Microcontroller (U1). When the Microcontroller (U1) becomes active, the Microcontroller (U1) checks and/or conditions the battery 14, via the battery voltage A/D circuit 78 and the thermistor sense circuit 74 prior to preventing or beginning charging of the battery 14. If charging begins, the Microcontroller (U1) signals the switch driver circuit 70 to begin turning the power switch means 34 on and off to create charge current via the buck regulator (the power switch means 34, the rectifier (diode D7), the inductor (L1) and the battery 14). If the Microcontroller (U1) does not signal the switch driver circuit 70, the battery charging circuit 18 and the power switch means 34 remain inactive. Because on/off signals from the Microcontroller (U1) are used to create power for the switch driver circuit 70, if the switch driver circuit 70 has no power, the power switch means 34 cannot turn on.

Figure 4:
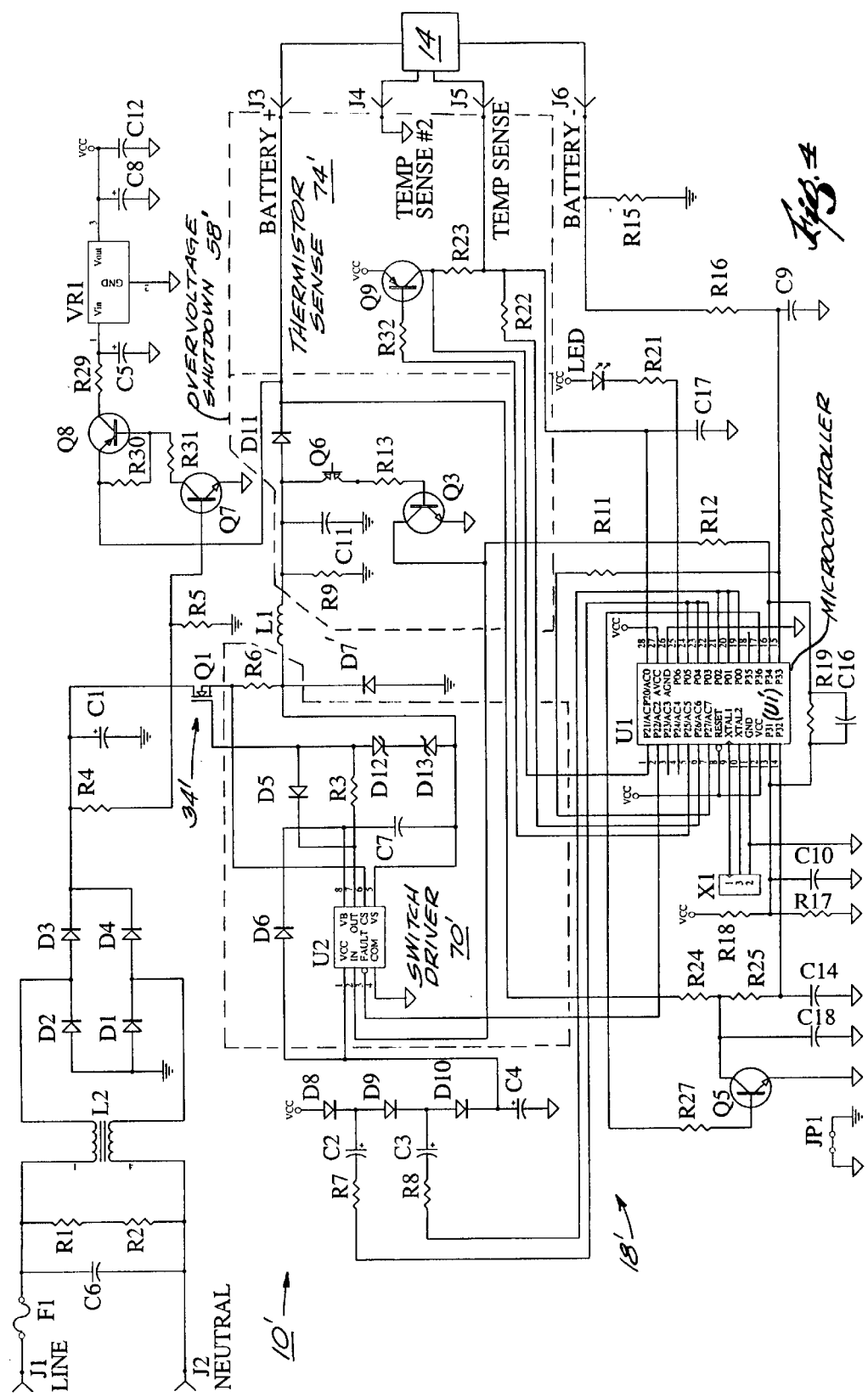
FIG. 4 is a schematic diagram of an alternative embodiment of the battery charging circuit illustrated in FIG. 2.
Figure 5:
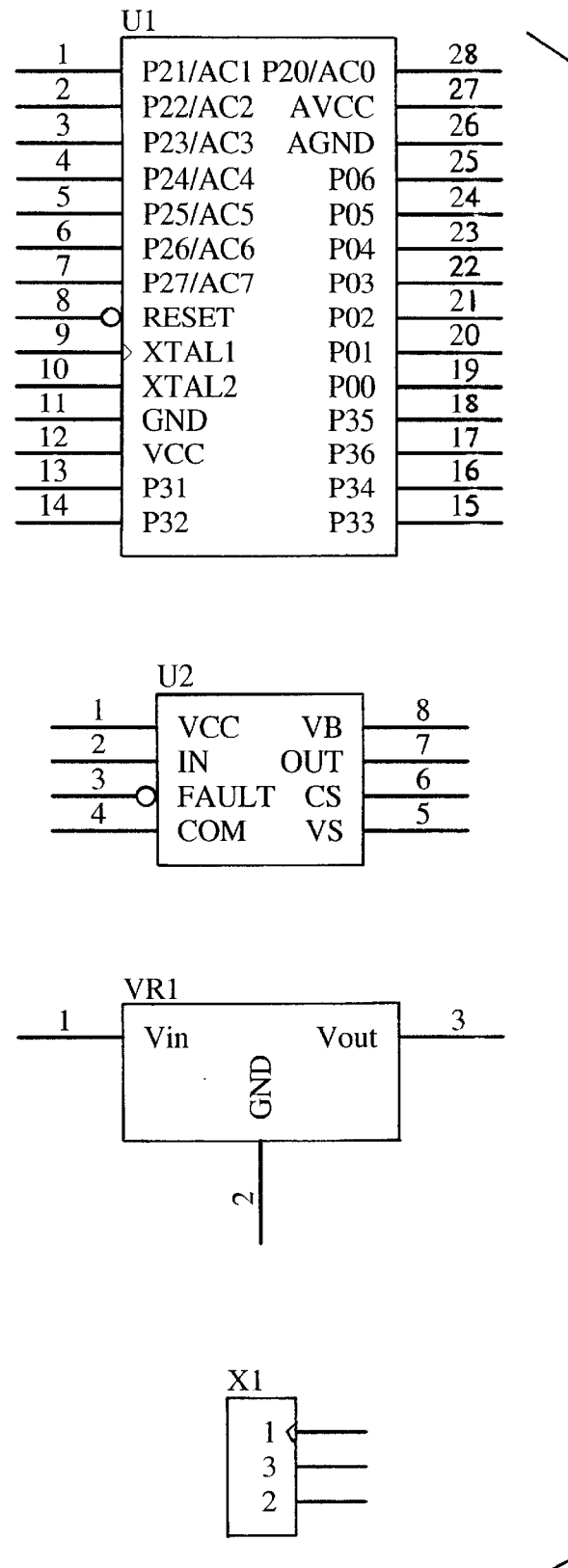
FIG. 5 is an enlarged view of components illustrated in FIGS. 3 and 4.

FIG. 4 illustrates another embodiment of a battery charging circuit 18'. Common elements are identified by the same reference numbers "'". The battery charging circuit 18' is similar to the battery charging circuit 18, as described above, with the following differences:

(1) the battery charging circuit 18' does not include the capacitor (C12);
(2) the over voltage shut down circuit 58' does not include the capacitor (C21);
(3) the switch driver circuit 70' does not include the resistors (R10 and R14) and capacitor (C13); and
(4) the thermistor sense circuit 74' includes the TEMP SENSE #2. The operation of the battery charging circuit 18' is similar to the operation described above for the battery charging circuit 18.

Various features of the invention are set forth in the following claims.

We claim:

1. A battery charger comprising:
    a battery charging circuit electrically connectable to a power source and to a battery and operable to charge the battery, said circuit including power switch means operable to provide power from the power source to charge the battery; and
    control means for operating the circuit, said control means being electrically connected to said circuit and providing a control signal to said power switch means to control said power switch means, the power source, the battery, said power switch means and said control means being electrically connectable by said circuit so that, when one of the power source, the battery, said power switch means and said control means malfunctions, said circuit does not operate to charge the battery;
    wherein said charger is operable to charge a first type of battery and a second type battery, the chemistry of the first type of battery being different from the chemistry of the second type of battery, and wherein said circuit further includes means for identifying a type of battery connected to said circuit, said identifying means outputting an identification signal to said control means, said identification signal being related to the type of battery connected to said circuit;
    wherein the first type of battery has a first thermistor value, wherein the second type of battery has a second thermistor value, and wherein said identifying means includes a thermistor sense circuit for sensing a thermistor value of a battery connected to said circuit, said thermistor sense circuit outputting the identification signal to said control means, said identification signal being related to the thermistor value of the battery connected to said circuit.

2. The charger as set forth in claim 1 wherein said circuit electrically connects the power source, the battery, said power switch means and said control means in series.

3. The charger as set forth in claim 1 wherein, when said charger operates to charge the battery, said control means monitors said circuit, and wherein, when one of the power source, the battery and said power switch means malfunctions, said control means operates to prevent said circuit from charging the battery.

4. The charger as set forth in claim 1 wherein said control means includes a Microcontroller electrically connected to said circuit, said Microcontroller being operable to output the control signal to control said power switch means.

5. The charger as set forth in claim 1 wherein the battery, when connected to said circuit, supplies power to operate said control means.

6. The charger as set forth in claim 1 wherein said control means operates said power switch means to charge the first type of battery, when the first type of battery is connected to said circuit, and to charge the second type of battery, when the second type of battery is connected to said circuit.

7. The charger as set forth in claim 6 wherein the first type of battery has a first charging termination point, wherein the second type of battery has a second charging termination point, wherein, when the first type of battery is connected to said circuit, said control means operates said power switch means to terminate charging of the first type of battery at the first charging termination point, and wherein, when the second type of battery is connected to said circuit, said control means operates said power switch means to terminate charging of the second type of battery at the second charging termination point.

8. A method of charging a battery, said method comprising the acts of:
    providing a battery charger including a battery charging circuit electrically connectable to a power source and to the battery and operable to charge the battery, the circuit including power switch means operable to provide power from the power source to charge the battery, and a Microcontroller for operating the circuit, the Microcontroller being electrically connected to the circuit and being operable to provide an output signal to the power switch means to control the power switch means;
    connecting the battery charger to the power source;
    connecting the battery to the battery charger;
    electrically connecting the power source, the battery, the power switch means and the Microcontroller so that, when the battery is connected to the circuit, if one of the power source, the battery, the power switch means and the Microcontroller malfunctions, the circuit will not operate to charge the battery;
    charging the battery;
    monitoring the circuit to determine when one of the power source, the battery, the power switch means and the Microcontroller malfunctions; and
    if one of the power source, the battery, the power switch means and the Microcontroller malfunctions, preventing the circuit from charging the battery;
    wherein the charger is operable to charge a first type of battery and a second type battery, the chemistry of the first type of battery being different from the chemistry of the second type of battery, and wherein said method further comprises the acts of:
        identifying a type of battery connected to the circuit; and
        outputting an identification signal to the Microcontroller, the identification signal being related to the type of battery connected to the circuit;
    wherein the first type of battery has a first thermistor value, wherein the second type of battery has a second thermistor value, wherein said act of identifying the type of battery connected to the circuit includes sensing a thermistor value of a battery connected to the circuit, and wherein said act of outputting the identification signal to the Microcontroller includes outputting the identification signal related to the thermistor value of the battery connected to the circuit.

9. The method as set forth in claim 8 wherein the act of electrically connecting the power source, the battery, the power switch means and the Microcontroller includes electrically connecting the power source, the battery, the power switch means and the Microcontroller in series.

10. The method as set forth in claim 8 and further comprising, after said act of electrically connecting the power source, the battery, the power switch means and the Microcontroller, the act supplying power from the battery to operate the Microcontroller.

11. The method as set forth in claim 8 wherein said act of charging the battery includes operating the power switch means to charge the first type of battery, when the first type of battery is connected to the circuit, and operating the power switch means to charge the second type of battery, when the second type of battery is connected to the circuit.

12. The method as set forth in claim 11 wherein the first type of battery has a first charging termination point, wherein the second type of battery has a second charging termination point, wherein, when the first type of battery is connected to the circuit, said act of charging the battery includes operating the power switch means to terminate charging of the first type of battery at the first charging termination point, and wherein, when the second type of battery is connected to the circuit, said act of charging the battery includes operating the power switch means to terminate charging of the second type of battery at the second charging termination point.

13. A battery charger comprising:
   a battery charging circuit connectable to a power source and to a battery and operable to charge the battery; and
   a Microcontroller electrically connected to and for operating said circuit, the battery, when connected to said circuit, supplying power to operate said Microcontroller;
   wherein said charger is operable to charge a first type of battery and a second type battery, the first type of battery having a first thermistor value, and the second type of battery having a second thermistor value, and wherein said circuit includes a thermistor sense circuit for sensing a thermistor value of a battery connected to said circuit, said thermistor sense circuit outputting an identification signal to said control means, said identification signal being related to the thermistor value of the battery connected to said circuit.

14. The battery charger as set forth in claim 13 wherein said battery charging circuit includes power switch means operable to provide power from the power source to charge the battery, and wherein the power source, the battery, said power switch means and said control means are electrically connectable by said circuit so that, when one of the power source, the battery, said power switch means and said control means malfunctions, said circuit does not operate to charge the battery.

15. The charger as set forth in claim 13 wherein said circuit electrically connects the power source, the battery, said power switch means and said control means in series.

16. The charger as set forth in claim 13 wherein the first type of battery has a first charging termination point, wherein the second type of battery has a second charging termination point, wherein, when the first type of battery is connected to said circuit, said Microcontroller operates said power switch means to terminate charging of the first type of battery at the first charging termination point, and wherein, when the second type of battery is connected to said circuit, said Microcontroller operates said power switch means to terminate charging of the second type of battery at the second charging termination point.

17. A method for operating a battery charger, the battery charger including a battery charging circuit connectable to a power source and to a battery and operable to charge the battery, and a Microcontroller electrically connected to and for operating the circuit, said method comprising the acts of:
   providing a battery;
   connecting the battery to the battery charging circuit; and
   supplying power from the battery to the Microcontroller to operate the Microcontroller;
   wherein the charger is operable to charge a first type of battery and a second type battery, the first type of battery having a first thermistor value, and the second type of battery having a second thermistor value, and wherein said method further comprises the acts of:
      identifying a type of battery connected to the circuit, said act of identifying the type of battery connected to the circuit including sensing a thermistor value of a battery connected to the circuit; and
      outputting an identification signal to the Microcontroller, the identification signal being related to the thermistor value of the battery connected to the circuit.

18. The method as set forth in claim 17 wherein the battery charging circuit includes power switch means operable to provide power from the power source to charge the battery, and wherein said method further comprises the acts of:
   electrically connecting the power source, the battery, the power switch means and the Microcontroller so that, when the battery is connected to the circuit, if one of the power source, the battery, the power switch means and the Microcontroller malfunctions, the circuit will not operate to charge the battery;
   charging the battery;
   monitoring the circuit to determine when one of the power source, the battery, the power switch means and the Microcontroller malfunctions; and
   if one of the power source, the battery, the power switch means and the Microcontroller malfunctions, preventing the circuit from charging the battery.

19. The method as set forth in claim 18 and further comprising, after said act of electrically connecting the power source, the battery, the power switch means and the Microcontroller, the act supplying power from the battery to operate the Microcontroller.

20. The method as set forth in claim 17 and further comprising the act of charging the battery, said act of charging the battery including operating the power switch means to charge the first type of battery, when the first type of battery is connected to the circuit, and operating the power switch means to charge the second type of battery, when the second type of battery is connected to the circuit.

21. A software program for operating a battery charger, the battery charger including a battery charging circuit connectable to a power source and to a battery and operable to charge the battery, the battery charging circuit including power switch means operable to provide power from the power source to charge the battery, said software program operating the battery charger by:

monitoring the circuit to determine if one of the power source, the battery and the power switch means malfunctions; and if one of the power source, the battery and the power switch means malfunctions, preventing the circuit from charging the battery;

wherein the charger is operable to charge a first type of battery and a second type battery, the first type of battery having a first thermistor value, and the second type of battery having a second thermistor value, and wherein said software program further operates the battery charger by, when the battery is connected to the circuit;

identifying a type of battery connected to the circuit by sensing a thermistor value of a battery connected to the circuit; and receiving an identification signal related to the thermistor value of the battery connected to the circuit.

22. The software program as set forth in claim 21 and further operating the battery charger by, when the battery is connected to the circuit, receiving power from the battery.

23. The software program set forth in claim 21 and further operating the battery charger by outputting a control signal to the power switch means to charge the battery, said act of outputting a control signal including operating the power switch means to charge the first type of battery, when the first type of battery is connected to the circuit, and operating the power switch means to charge the second type of battery, when the second type of battery is connected to the circuit.

24. The software program as set forth in claim 23 wherein the first type of battery has a first charging termination point, wherein the second type of battery has a second charging termination point, wherein, when the first type of battery is connected to the circuit, said act of outputting a control signal includes operating the power switch means to terminate charging of the first type of battery at the first charging termination point, and wherein, when the second type of battery is connected to the circuit, said act of outputting a control signal includes operating the power switch means to terminate charging of the second type of battery at the second charging termination point.

* * * * *